(12) United States Patent
Christopher

(10) Patent No.: US 7,728,729 B2
(45) Date of Patent: *Jun. 1, 2010

(54) METHODS FOR LOCATING AN ENTITY WITHIN A STRUCTURE USING RFID

(75) Inventor: James Christopher, La Mesa, CA (US)

(73) Assignee: Insight Holding Group, Inc., La Mesa, CA (US)

(*) Notice: Subject to any disclaimer, the term of this patent is extended or adjusted under 35 U.S.C. 154(b) by 252 days.

This patent is subject to a terminal disclaimer.

(21) Appl. No.: 11/506,179

(22) Filed: Aug. 16, 2006

(65) Prior Publication Data

US 2008/0042829 A1 Feb. 21, 2008

(51) Int. Cl.
*G08B 13/14* (2006.01)
(52) U.S. Cl. ............... 340/572.1; 235/385; 340/539.13
(58) Field of Classification Search .............................. 340/539.11–539.16, 286.05–286.07, 572.1; 235/454, 385
See application file for complete search history.

(56) References Cited

U.S. PATENT DOCUMENTS

| | | | |
|---|---|---|---|
| 7,100,817 B2 | 9/2006 | Leger et al. | |
| 7,117,121 B2 | 10/2006 | Brinton et al. | |
| 7,167,095 B2* | 1/2007 | Carrender | 340/572.4 |
| 7,242,303 B2* | 7/2007 | Patel et al. | 340/572.4 |
| 7,295,114 B1* | 11/2007 | Drzaic et al. | 340/572.1 |
| 2005/0040224 A1 | 2/2005 | Brinton et al. | |
| 2005/0107934 A1* | 5/2005 | Gudat et al. | 701/50 |
| 2005/0200476 A1 | 9/2005 | Forr et al. | |
| 2005/0237193 A1* | 10/2005 | Namm et al. | 340/572.1 |
| 2005/0243784 A1 | 11/2005 | Fitzgerald et al. | |
| 2005/0246092 A1* | 11/2005 | Moscatiello | 701/207 |
| 2006/0022038 A1* | 2/2006 | Hewlin et al. | 235/385 |
| 2006/0044141 A1 | 3/2006 | Vesikivi et al. | |
| 2006/0081697 A1 | 4/2006 | Brinton et al. | |
| 2006/0103505 A1* | 5/2006 | Hulvey | 340/10.2 |
| 2006/0171538 A1 | 8/2006 | Larson et al. | |
| 2006/0208857 A1 | 9/2006 | Wong | |

OTHER PUBLICATIONS

Nokia Unveils RFID Phone Reader, Copyright 2002-2007 RFID Journal, Inc., Mar. 17, 2004, http://www.rfidjournal.com/article/articleview/834/1/1/.

(Continued)

*Primary Examiner*—Brent Swarthout
(74) *Attorney, Agent, or Firm*—Sheppard Mullin Richter & Hampton LLP; David E. Heisey

(57) ABSTRACT

The present invention provides method for locating an entity within a structure using RFID system including a portable RF transmitter/receiver transported by the entity within the structure, a base unit, and a plurality of RFID tags, the method comprising the steps of: (a) emitting an RF interrogation signal at constant, predetermined intervals; (b) powering up and emitting a signal containing location data; (c) receiving the location data and broadcasting the location data to the base unit; and (d) receiving and displaying the location data; wherein steps (a) and (c) are performed by the RF transmitter/receiver, step (b) is performed by an RFID tag when the RF interrogation signal is within an effective range of the RFID tag, and step (d) is performed by the base unit.

15 Claims, 8 Drawing Sheets

OTHER PUBLICATIONS

Microsoft's Amazing Virtual Earth, dailywireless.org, SAMC, Nov. 6, 2006, http://www.dailywireless.org/2006/11/06/microsofts-amazing-virtual-earth/.

Mine Site Techologies: TRACKER Tagging http://www.minesite.com.au/coal_mines_tracker_taggingc, Nov. 11, 2006.

Mine Site Techologies: TRACKER System Gives Immediate Benefits to Kundana http://www.minesite.com.au/tracker_system_gives_immediate_benefits_to_kundana.

Miller, L.E., et al., RFID-Assisted Indoor Localization and Communication for First Responders, National Institute of Standards and Technology (NIST), Mar. 8, 2006 http://www.antd.nist.gov/wctg/RFID/RFIDassist.htm.

Miller, L.E., et al., Indoor Navigation for First Responders: A Feasibility Study, Wireless Communication Technologies Group, Advanced Networking Technologies Division, Information Technology Laboratory, National Institute of Standards and Technology, Feb. 10, 2006, http://www.antd.nist.gov/wctg/RFID/RFIDassist.htm.

Miller, L.E., et al. FY 2005 Interim Project Report, RFID-Assisted Localization and Communication for First Responders, Oct. 25, 2005, (rev. Mar. 22, 2006), National Institute of Standards and Technology, http://www.antd.nist.gov/wctg/RFID/RFIDassist.htm.

* cited by examiner

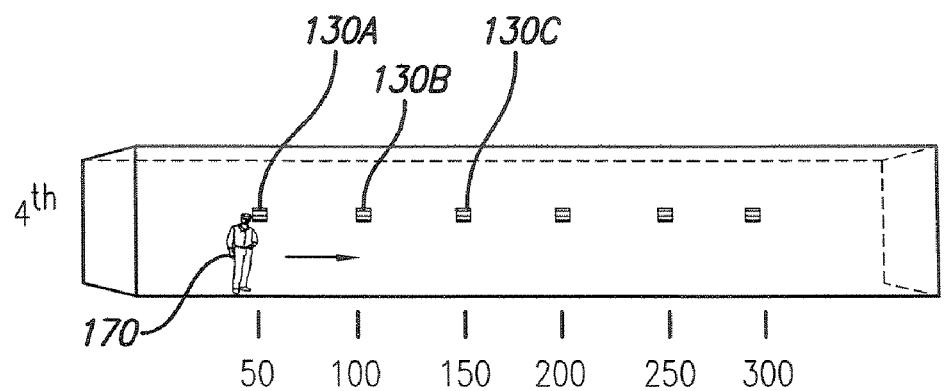
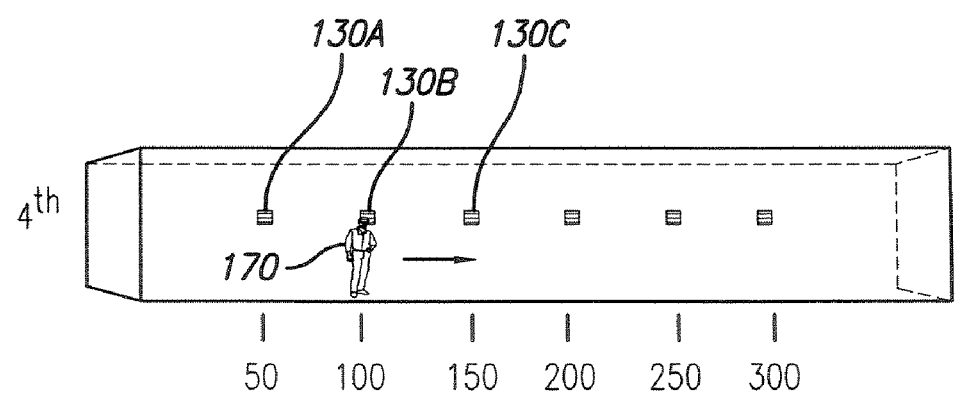
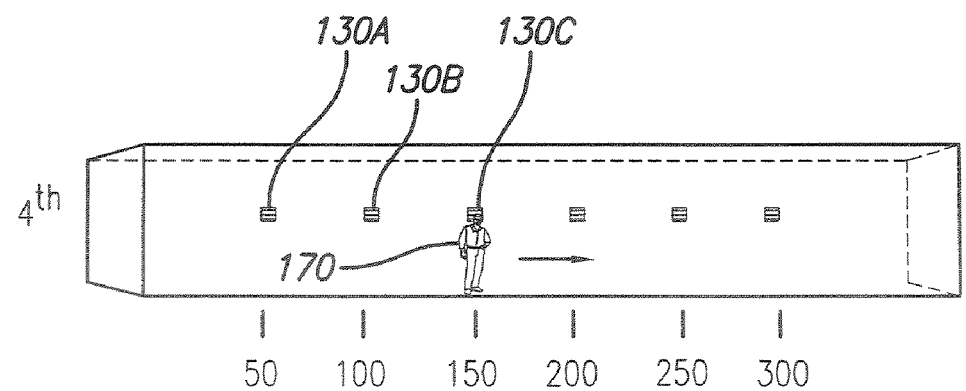
FIG. 3

| NAME: FIREMAN #5 | | | LOG DATE: 27 JULY 2006 |
|---|---|---|---|
| BUILDING: ACME CORPORATE OFFICES<br>BUILDING ADDRESS: 1313 FIRST AVE.<br>NEW YORK, NY 1001 ||||
| FLOOR | TAG# | TIME | LOCATION |
| 1 | 1-1 | 12:01:00 | ENTRANCE - WEST |
| 2 | 2-1 | 12:02:00 | STAIRWELL - WEST WALL |
| 3 | 3-1 | 12:03:00 | STAIRWELL - WEST WALL |
| 4 | 4-1 | 12:04:00 | STAIRWELL - WEST WALL |
| 4 | 4-50 | 12:04:10 | MAIN CORRIDOR - 50FT FROM WEST WALL |
| 4 | 4-100 | 12:04:20 | MAIN CORRIDOR - 100FT FROM WEST WALL |
| 4 | 4-150 | 12:04:30 | MAIN CORRIDOR - 150FT FROM WEST WALL |
|  |  |  |  |
|  |  |  |  |
|  |  |  |  |

METHODS FOR LOCATING AN ENTITY WITHIN A STRUCTURE USING RFID

FIELD OF THE INVENTION

The present invention relates generally to methods for locating an entity within a structure and, more particularly, to methods for locating an entity within a structure using RFID technology.

BACKGROUND OF THE INVENTION

Catastrophic events such as Hurricane Katrina and the attacks on the World Trade Center exposed weaknesses in emergency response systems. The primary lesson learned from these disasters is the need for a central command to know exactly where police, fire, and other first-responder personnel are located. Current emergency service agencies have access to systems to track and locate vehicles; however, these agencies lack the ability to rapidly locate an individual.

Many solutions to the problem of rapidly locating personnel have been proposed, including Global Positioning System (GPS) systems, cell phone-based systems, and radio relay systems. Each of these solutions has significant limitations. Vehicle tracking systems use GPS technology with radio transmitters to geo-locate and report the position of a vehicle. In most instances, the problem is two-dimensional, wherein a vehicle is assumed to be ground level and the system needs only solve for latitude and longitude. However, in metropolitan areas, the problem is frequently three-dimensional. For example, personnel can be above ground-level in a building or below ground-level in subways. Commercially available GPS are simply not accurate enough to precisely locate personnel in high rise buildings, and GPS signals do not reach deep under ground in subways or in mines.

Cell phones have also been proposed as a solution for locating personnel and many cell phone manufacturers are adding GPS to their phone for this purpose. However, by incorporating GPS, this proposed solution suffers from the same limitations of any GPS solution. In addition, cell phones also suffer from signal loss or interference such as when located within buildings or when located underground (e.g., in subways). After Hurricane Katrina, much of the communication and power networks were knocked out by the storm, including many cell towers. Katrina taught us that emergency systems should be completely autonomous, such that emergency systems should not depend on cell phones or electricity from a power grid. Emergency agencies, therefore, cannot depend on cell phones in as the primary means of locating personnel.

SUMMARY OF THE INVENTION

In view of the foregoing, it is an object of the present invention to provide methods for locating an entity within a structure using RFID technology to allow rapid location of any entity (individual or item) on any floor in a building or deep underground such as in a subway or mine. According to the method described herein, the entity is fitted with a portable RFID transmitter/receiver, while the surrounding environment will be instrumented with RFID tags. Each RFID tag may comprise a passive or active device that transmits its location to the transmitter/receiver. In turn, the transmitter/receiver transmits the location of the entity to a base unit computer which displays the location of the entity.

One aspect of the present invention involves a method for locating an entity within a structure using RFID system including a portable RF transmitter/receiver transported by the entity within the structure, a base unit, and a plurality of RFID tags, the method comprising the steps of: (a) emitting an RF interrogation signal at constant, predetermined intervals; (b) powering up and emitting a signal containing location data; (c) receiving the location data and broadcasting the location data to the base unit; and (d) receiving and displaying the location data; wherein steps (a) and (c) are performed by the RF transmitter/receiver, step (b) is performed by an RFID tag when the RF interrogation signal is within an effective range of the RFID tag, and step (d) is performed by the base unit. An additional step may entail storing the location information, a unique RFID tag identification, and a time of entry on the base unit.

According to the method for locating an entity within a structure, the plurality of RFID tags are disposed at predetermined intervals within a multiple story building, such that when the RF transmitter/receiver is within a range of an RF tag, the RF transmitter/receiver records an RF signal containing unique location information of the RF tag within the structure. The RF transmitter/receiver then broadcasts the location of the RF tag to the base unit computer, which maintains a log of the location of the RF tag. According to some embodiments, an RFID tag is positioned at an entrance to the structure which includes general information about the structure such as contact information for the structure, the number of floors, and possibly, a schematic of the structure. Additionally, the base unit will maintain a base log comprising information including the identification of the entity, the name of the structure, the location of the structure, the current date, and entries for the position and time of the entity as it moves through the structure.

Another aspect of the invention involves an RFID system for locating an entity within a structure, the system comprising a portable RF transmitter/receiver transported by the entity within the structure, a base unit, and a plurality of passive RFID tags, wherein the RF transmitter/receiver records the location of an RF tag and broadcasts the location of the RF tag to the base unit. According to the preferred embodiment, the RFID tags are passive devices that do not require AC or DC power, and each RFID tag has an RF signal containing unique location information. In addition, the base unit comprises a computer including a processor, a memory, an operating system, a database, a human-machine interface (HMI), and an RF receiver that may be in the form as a PC card or a PCMCI card or with a USB interface. The portable RF transmitter/receiver unit is battery-operated.

According to one implementation of the RFID system, the plurality of RFID tags are disposed at predetermined intervals within a multiple story building, and additional RFID tags may be provided at entrances and stairwells of the building. When the RF transmitter/receiver is within a range of an RF tag, the RF transmitter/receiver records an RF signal containing unique location information of the RF tag within the structure. Then, the RF transmitter/receiver broadcasts the location of the RF tag to the base unit computer, which maintains a log of the location of the RF tag. According to other embodiments, the structure may comprise a mine or a subway.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will now be described, by way of example only, with reference to the following drawings, in which:

FIG. 3 is a schematic diagram illustrating the progression of a fireman through the structure while wearing a portable RFID transmitter/receiver;

DETAILED DESCRIPTION OF THE PREFERRED EMBODIMENTS

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to methods for locating an entity within a structure using RFID system including a portable RF transmitter/receiver transported by the entity within the structure, a base unit, and a plurality of RFID tags, the method comprising: (a) emitting an RF interrogation signal at constant, predetermined intervals; (b) powering up and emitting a signal containing location data; (c) receiving the location data and broadcasting the location data to the base unit; and (d) receiving and displaying the location data; wherein steps (a) and (c) are performed by the RF transmitter/receiver, step (b) is performed by an RFID tag when the RF interrogation signal is within an effective range of the RFID tag, and step (d) is performed by the base unit. A further step may comprise storing the location information, a unique RFID tag identification, and a time of entry on the base unit.

In conventional systems, an RFID tag is attached to the entity such that the tag may move past a stationary RFID receiver, referred to as an "interrogator", and the system records the information from the tag. There are several proposals for use of RFID technology in buildings or for emergency personnel. Such stationary systems require installation of RFID interrogators throughout buildings to accurately track personnel locations, which can be incredibly expensive and impractical, particularly when considering that the interrogators are far more expensive than the RFID tags. In addition, the interrogators require emergency backup power when there is a loss of power to the building. In the RFID system of the present invention, the process is reversed so that a plurality of stationary RFID tags are positioned at predetermined locations throughout structures such as buildings and subways, wherein each stationary tag identifies the exact location of an entity within the structure. In view of the high relative cost of the conventional stationary RFID receivers, placing RFID tags throughout the building and only requiring a limited number of emergency personnel to wear an RF transmitter/receiver will result in an enormous cost savings, particularly for large structures.

Figure 1:
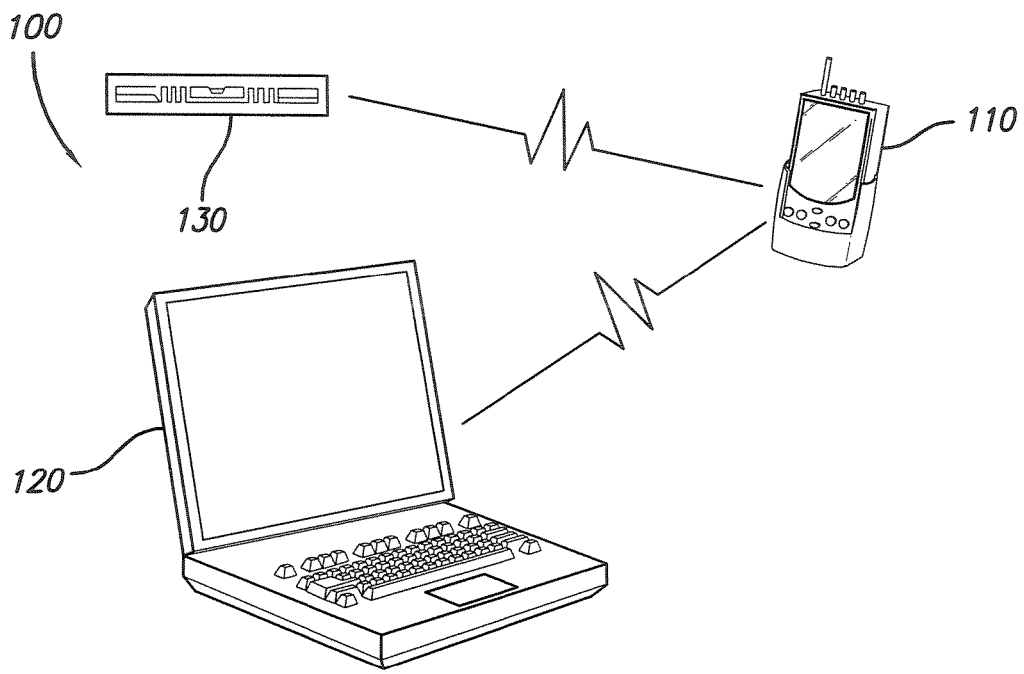
FIG. 1 is a notional illustration of an RFID system for locating an entity within a structure, in accordance with the principles of the present invention.

Referring to FIG. 1, in accordance with the principles of the invention, an RFID system 100 for locating an entity within a structure comprises one or more portable radio frequency (RF) transmitter/receiver units 110, a base unit 120 providing a command and control function, and a plurality of passive RFID tags 130. According to other embodiments described herein, active RFID tags 130 may be employed. The base unit 120 may comprise a computer including a processor, a memory, an operating system, a database, an HMI, and an RF receiver. The RF receiver may comprise a PC card on the motherboard or a PCMCI card or with a USB interface, including interface software comprising machine readable instructions for allowing communication between the RF transmitter/receiver 110 and the base unit receiver, and then unpacking the data transmissions and load records to a database (not depicted). The portable RF transmitter/receiver unit 110 is battery-operated, wherein battery life is sufficient for the duration of an operation, but not necessarily for extended periods.

Since the RFID system 100 of the invention broadcasts location data in real time, the location of the person (or entity) is recorded at the base unit 120. Using the location data, rescue personnel can be immediately directed to the real time location of the entity within a structure, and the man-portable unit does not need to continually function as a beacon. By way of example, the structure may comprise a building, subway or mine. One of ordinary skill in the art will appreciate that the RFID system 100 may be employed to locate entities within various other structures without departing from the scope of the invention.

Figure 2:
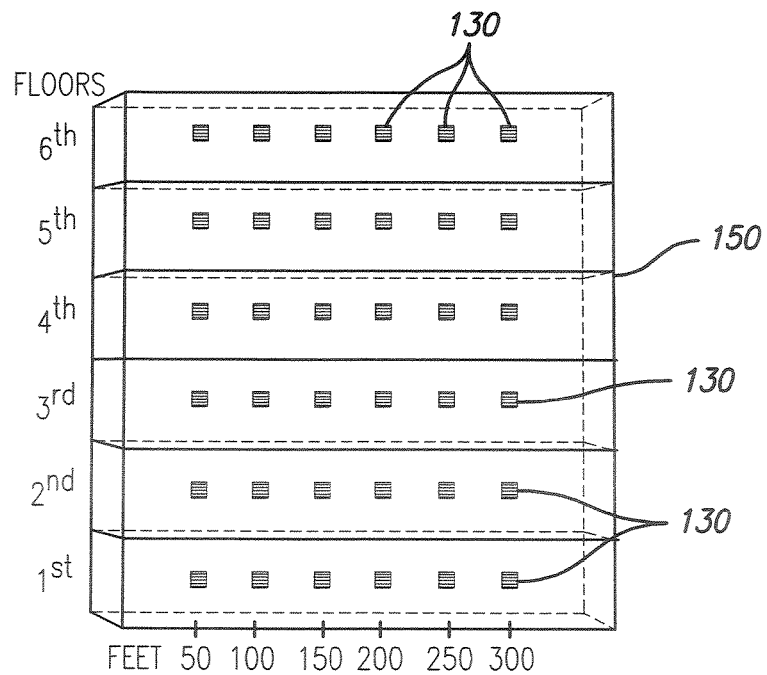
FIG. 2 is a schematic diagram illustrating an exemplary implementation of the RFID system of FIG. 1 within a six-story structure.

FIG. 2 illustrates a schematic view showing the implementation of the RFID system 100 of the invention within a six-story structure 150. Specifically, the RFID system 100 comprises a plurality of passive RFID tags 130 disposed at predetermined intervals within the six-story structure 150. In the illustrated embodiment, the passive RFID tags 130 are separated by intervals of approximately fifty feet. Additional tags 130 may be provided at other locations within the structure 150, for example at entrances, exits, stairwells, particular rooms, or every room in the structure 150. According to the invention, a standard may be developed to determine an appropriate or optimum distance between passive tags 130 for a particular structure. According to a preferred implementation of the invention, the RFID tags 130 are passive devices such that they do not require AC or DC power, and each tag 130 has an RF signal containing unique location information. In operation, an RF transmitter/receiver (attached to an entity within the structure 150) sends a signal to an RF tag 130 and then records the RF signal of the tag 130. As set forth above, the RFID system 100 has many additional useful applications such as with respect to mining operations, hospitals, and other business where one needs to quickly locate people or assets, particularly during an emergency situation.

According to a further embodiment of the invention, active RFID tags 130 may be employed within the RFID system 100. In this embodiment, the base computer 120 emits an RF interrogation signal at predetermined, constant, rapid intervals. Once the base computer 120 enters the effective range of an active RFID tag 130, the active tag 130 receives the request and transmits radio waves including signals representing building data, such as the address of the building, contact information, and/or a schematic of the building. Upon receiving the building data, the base unit computer 120 stores the building data, and displays the building data on a human-machine interface (HMI) such as a GUI. Unlike the passive tags, the active tags of this embodiment require an AC or DC power source.

FIG. 3 is a schematic view that depicts the progression of a fireman 170 past the RFID tags 130, wherein the fireman 170 is wearing a portable RFID transmitter/receiver unit 110. As the fireman 170 walks past an RFID tag 130, the RF transmitter/receiver 110 records the location of the tag 130 and broadcasts the location of the tag 130 (and the fireman 170) to the base unit computer 120, which maintains a log of the current location of each RF transmitter/receiver 110 on an on-going basis. Locations are updated every time an RF transmitter/receiver 110 passes an RF tag 130. As such, the base unit 120 records the location of each entity (or fireman) that is accurate to the distance between RFID tags 130. In FIG. 3, the fireman 170 is illustrated as moving past RF tags 130 on the fourth floor of the structure 150 of FIG. 2. In the first frame, the fireman 170 passes the RFID tag 130A positioned at 50 feet from the left wall on the fourth floor of the structure. In the second frame, the fireman 170 walks past the tag 130B at 100 feet from the left wall. In the third frame, the fireman 170 passes the RFID tag 130C located 150 feet from the left wall. As the fireman 170 passes each RF tag 130, his personal RFID transmitter/receiver 110 records its location and forward the location to the base unit 120, which track the location in a log.

Figures 4, 5:
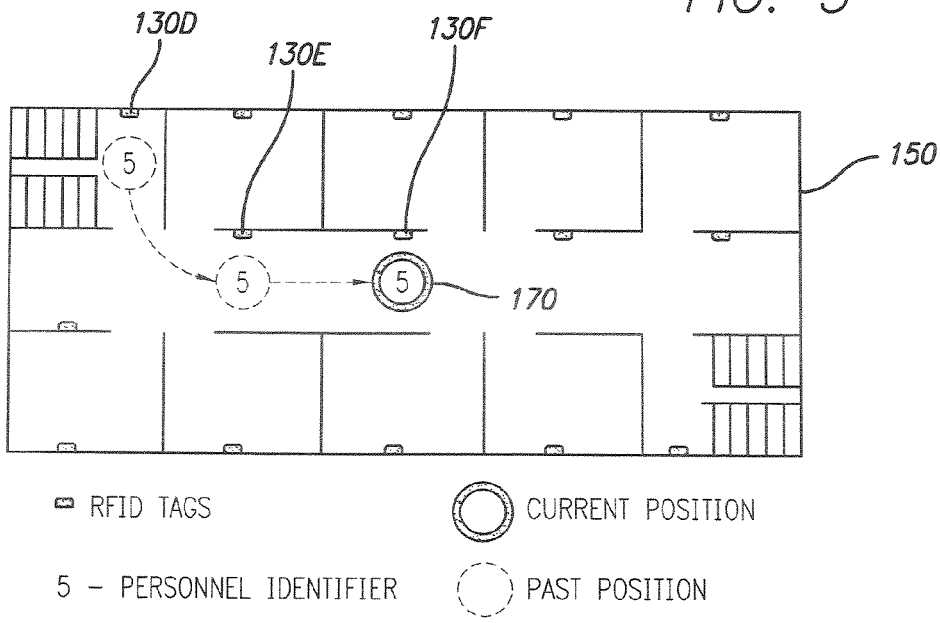
FIG. 4 illustrates a base unit log that details the fireman's location within the structure over time as the fireman moves through the structure.
FIG. 5 is a detailed sectional view of the $4^{th}$ floor of the structure illustrating the movement of the fireman through the structure.

FIG. 4 illustrates a base unit log 190 that details the fireman's location within the structure 150 over time as the fireman 170 moves through the structure 150. Particularly, the initial entry in the base unit log 190 was recorded as the fireman 170 entered the structure 150, passing an RFID tag 130 at the entrance. According to the invention, this particular entrance tag 130 may contain general information about the building such as address, the building's contact information, the number of floors, and/or a schematic of the building. In the illustrated embodiment, the base log 190 contains information pertaining to the identification of the fireman 170, the contact information of the structure 150, the address of the structure 150, the entity's position and time for each log entry, and the current date. The base unit log 190 then recorded the fireman's locations in real time as he traveled to the fourth floor via the stairwell, passing several more tags 130. The fireman 170 then exited the stairwell on the fourth floor, and the three highlighted entries in the base unit log 190 coincide with the movement of the fireman 170 illustrated in FIG. 3.

According to the invention, it is anticipated that the efficacy of the RFID system 100 will dramatically increase if an entire metropolitan area adopts a set of standards and associated regulations, for example to require the installation of RF tags in all multi-story buildings, subways, and in all mines. If all building owners were required to install RFID tags in a uniform manner, emergency personnel would be assured of consistency from building to building and accuracy of the location data at each specific building. By way of example, a standard for the spacing between tags may be adopted to ensure consistent data from building to building. Although greater accuracy (of locating personnel) may be realized by reducing the distance between RFID tags, this accuracy must be balance against the signal load to determine an optimum distance between tags.

FIG. 5 illustrates a detailed sectional view of the $4^{th}$ floor of the structure 150 for identifying and displaying the movement of specific personnel (e.g., the fireman 170) as they move through the structure 150. With the adoption of an entrance RFID tag 130, emergency personnel may download a schematic of the structure 150 to the base unit 120 to display a "Gods-eye" view of any floor of the structure 150. Once downloaded, the schematic is updated to show the movement of the fireman 170 every time he passes an RFID tag 130. In the illustrated embodiment, emergency personnel No. 5 (fireman 170) has recently moved from the stairwell on the $4^{th}$ floor (RFID tag 130D), past RFID tag 130E, and is currently positioned near RFID tag 130E.

The overall cost of implementing the RFID system described herein is very reasonable when compared with conventional solutions. More particularly, the cost for the base unit computer 120 is minimal since any standard laptop may be used, and only one base unit 120 is needed for the RFID system. The cost for the RFID transmitter/receiver units 110 will depend on how many any given agency will purchase; however, only one RFID transmitter/receiver 110 is needed for each emergency personnel or asset (rather than a multiplicity of interrogators disposed throughout each building). The cost for the RFID tags 130 is minimal at considerably less than one dollar per tag 130. Again, the actual cost will depend on the quantity ordered. It is anticipated that the costs for the base unit computer 120 and the RF transmitter/receiver units 110 will likely be covered by metropolitan agencies, whereas the costs for the RFID tags 130 (with regulations to ensure compliance) may be levied on building owners. Municipalities may find that the low cost of compliance for building owners is an added benefit for city-wide implementation.

The RFID system of the invention may be implemented utilizing Commercial, Off-The-Shelf (COTS) technology currently manufactured and sold by various companies. In particular, RFID tags and personal computers are readily available at any number of global suppliers. The base unit of the RFID system may further require a database for storing and retrieving information as well as a graphic user interface (GUI) for displaying the retrieved information. Stationary RFID interrogators that collect the data from an RFID tag and transmit the data via cable to a computer for processing are currently available. Additionally, manufacturers currently produce hand-held interrogators that collect data, and then download the data at a later time when the interrogator is placed in a cradle connected to a computer. For the RFID system set forth herein, a new type of portable interrogator is necessary that is capable of transmitting the recorded data to the base unit in real time. The unit is battery-operated, man-portable, as light weight as possible, and protected from the elements.

Figure 6:
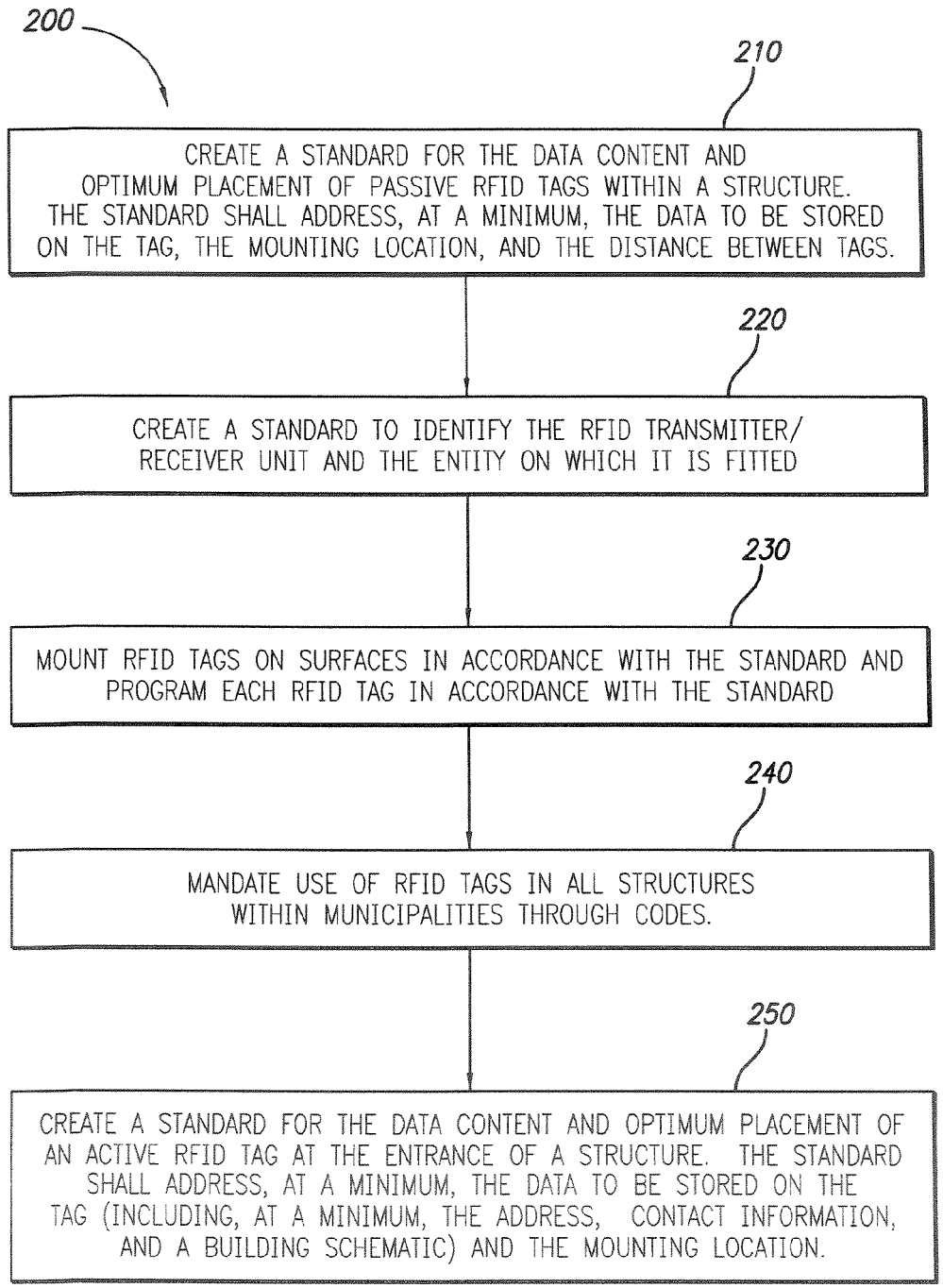
FIG. 6 is a flowchart illustrating a preferred method for standardizing RFID function and location for the RFID system, in accordance with the principles of the present invention.

Referring to FIG. 6, a preferred method 200 for standardizing RFID function and location for the RFID system of the invention will now be described. Initially, step 210 involves creating a standard for the data content and optimum placement of passive RFID tags 130 within a structure. At a minimum, the standard should address the data to be stored on the tag 130, the mounting location of the tag 130 and the distance between tags 130. Step 220 involves creating a standard for identifying the RFID transmitter/receiver unit 110 and the entity (or person) on which the unit 110 is fitted. This step may involve programming each RFID transmitter/receiver unit 110 to identify the individual, asset or entity to which it will be attached. Subsequently, step 230 involves mounting a plurality of RFID tags 130 on surfaces of the structure in accordance with the standard and programming each RFID tag 130 in accordance with the standard (i.e., using an RFID transmitter/receiver unit 110 to program the location data into the tags 130). According to some embodiments of the invention, the method may further entail the steps of: (1) mandating the use of RFID tags in all structures of a particular municipality (step 240); and/or (2) creating a standard for the data content and optimum placement of an RFID tag 130 at the entrance of a structure (step 250). This standard addresses the mounting location and the data to be stored on the tag, including the address, contact information, and a building schematic.

Figure 7:
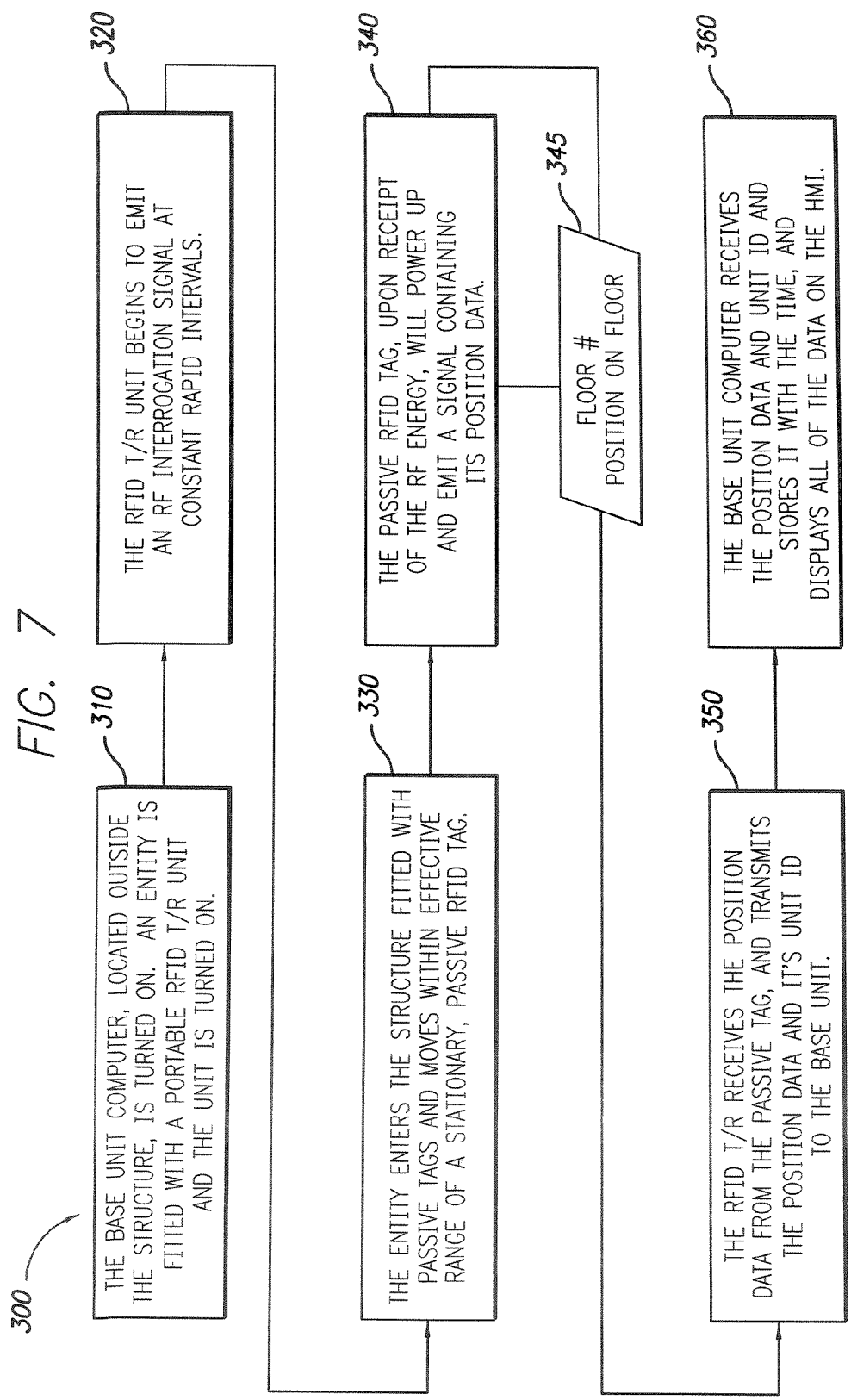
FIG. 7 is a flowchart illustrating a preferred method for data transmission from a passive tag to the RFID transmitter/receiver and to the base unit, in accordance with the principles of the present invention.

Referring to FIG. 7, a preferred method 300 for data transmission from a passive tag 130 to an RFID transmitter/receiver unit 110 and to the base unit computer 120 will now be described. In step 310, the base unit computer 120 (which is preferably located outside of the structure) is turned on and an entity (or person) is fitted with a portable RFID transmitter/receiver unit 110. In step 320, the portable RFID transmitter/receiver unit 110 emits an RF interrogation signal at constant, predetermined and rapid intervals. Step 330 involves the entity entering the structure fitted with passive RFID tags 130 and moving within the effective range of a stationary RFID tag 130. Upon receipt of the RF energy by the RFID tag 130, the method 300 proceed to step 340, wherein the passive tag 130 powers up and emits a signal 345 (or a series of signals) containing the location data, which may include, e.g., the floor number and location within the floor. In step 350, the RFID transmitter/receiver unit 110 receives the location data from the passive tag 130, and transmits the location data and its unit ID to the base unit 120. In step 360, the base unit computer 120 receives the location data and unit ID, stores this information with the time, and displays all of the data on the HMI.

Figure 8:
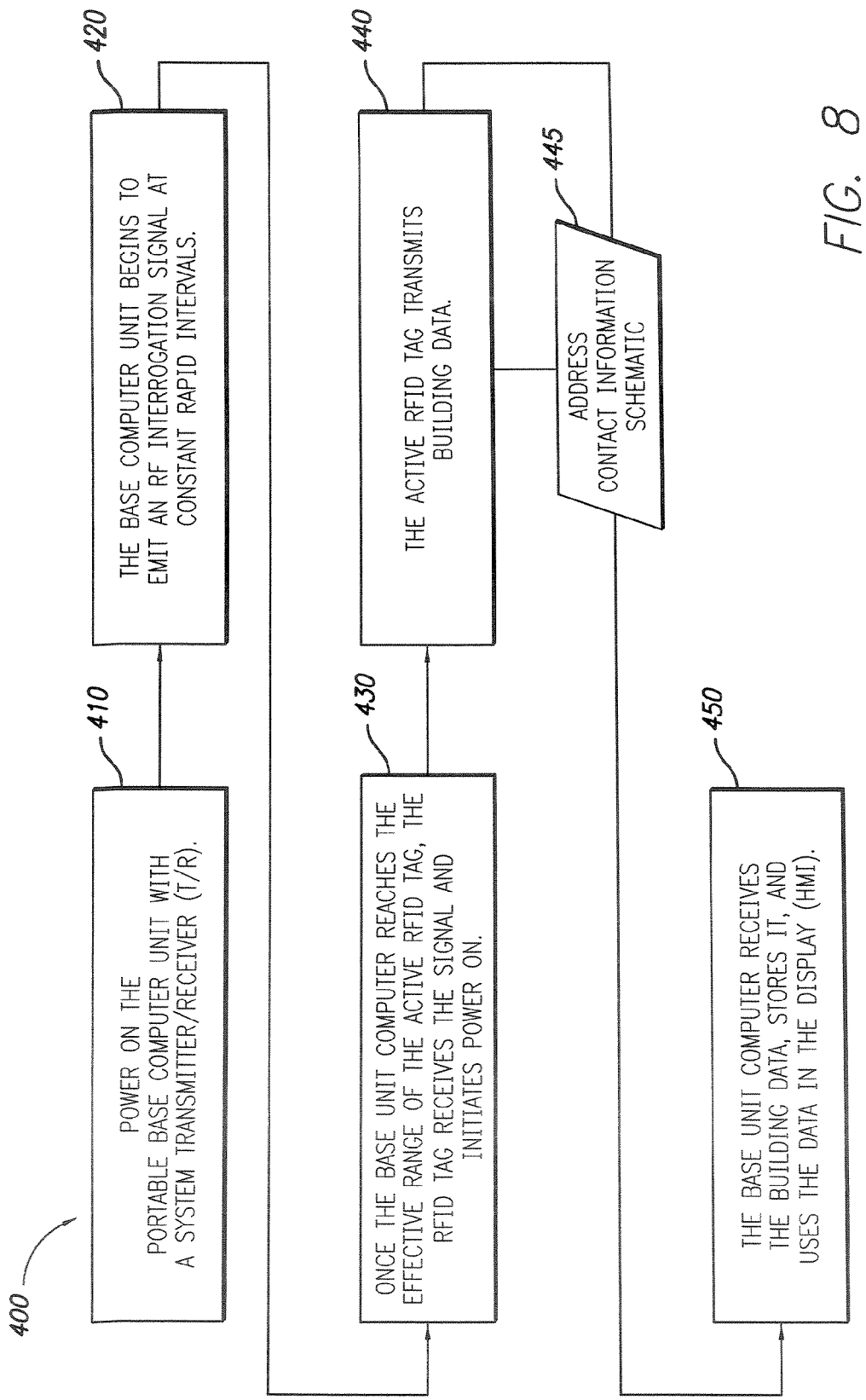
FIG. 8 is a flowchart illustrating a preferred method for downloading building data from an active RFID tag to the base unit computer, in accordance with the principles of the present invention.

Referring to FIG. 8, a preferred method 400 for downloading building data from an active RFID tag 130 to a base unit computer 120 having a system transmitter/receiver will now be described. Step 410 involves powering on the portable base unit 120. In step 420, the base computer 120 begins to emit an RF interrogation signal at predetermined, constant, rapid intervals. Once the base computer 120 enters the effective range of the active RFID tag 130, the method proceed to step 430, wherein the active tag 130 receives the signal and powers on. In step 440, the active RFID tag 130 transmits building data in the form of a signal 445 (or a series of signals). For example, the building data may include without limitation, the address of the building, contact information, and a schematic of the building. In step 450, the base unit computer 120 receives the building data, stores the building data, and displays the building data on the GUI.

Figure 9:
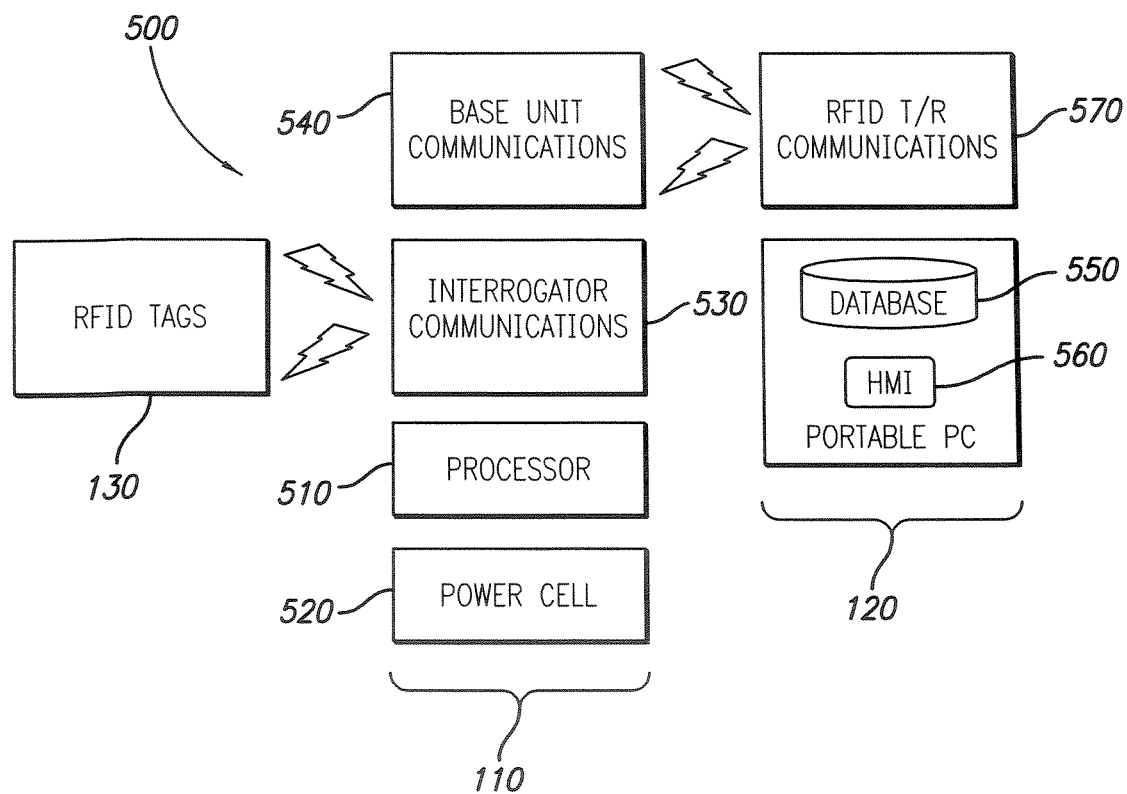
FIG. 9 is an exemplary block diagram illustrating the major components and radio wave communication between the components of the RFID system of the invention.

FIG. 9 is an exemplary block diagram 500 of the major components illustrating radio wave communication between the components of the RFID system 100, including RFID tags 130, RFID transmitter/receiver 110 and base unit computer 120. The portable RFID transmitter/receiver 110 comprises a processor 510, a power cell 520, interrogator communications 530 for interrogating the RFID tags 130, and base unit communications 540 for sending data to the base unit computer 120. The base unit 120 comprises a portable computer including at least one database 550, an HMI 560, and RFID transmitter receiver communications 570 for receiving data from the portable RFID transmitter/receiver 110. As would be understood by those of ordinary skill in the art, many additional system configurations are possible without departing from the scope of the invention.

Figure 10:
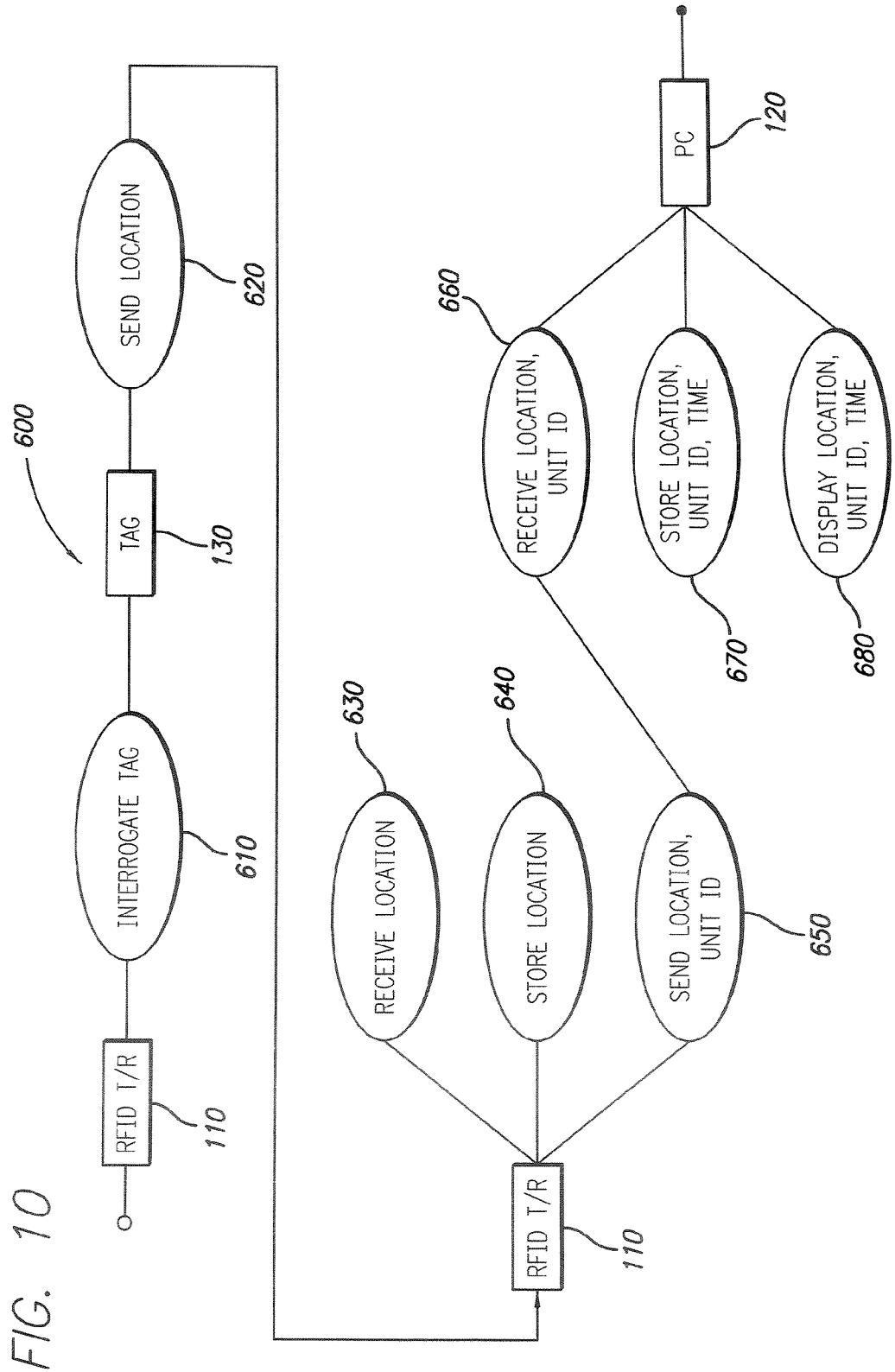
FIG. 10 is an exemplary process flow diagram illustrating process communication within the RFID system of the invention.

FIG. 10 is an exemplary process flow diagram 600 illustrating process communication within the RFID system 100 of the invention. In particular, the RFID transmitter/receiver 110 interrogates an RFID tag 130 (process 610), and, in response, the RFID tag 130 sends its location and RFID tag unit identification to the RFID transmitter/receiver 110 (process 620). Upon receiving the location information (process 630), the RFID transmitter/receiver 110 stores the location (process 640) and sends the location and RFID tag unit identification to the base unit computer 120 (process 650). The base unit 120 receives the location and RFID tag unit identification (process 660), stores the location, RFID tag unit identification and the time of the data entry (process 670), and displays the location, RFID tag unit identification and the time of the data entry (process 680). Other process flow arrangements are possible without departing from the scope of the invention.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A method for locating a plurality of entities within a structure using an RFID system including a plurality of portable units, a portable unit comprising a storage, a unique identity, and an RF transmitter/receiver transported by an entity within the structure, a base unit comprising an RF transmitter/receiver and a display, and a plurality of passive RFID tags, the method comprising the steps of:

the RF transmitter/receiver recording a location of an RFID tag;

the base unit storing the location of the RFID tag in the storage; and the RF transmitter/receiver broadcasting the identity of the unit and the location of the RFID tag to the base unit, which maintains a log of the identity of the unit and the location of the RFID tag, determines the location of the entity from the location of the RFID tag, determines the identity of the entity from the identity of the unit, and maintains a log of the location the entity;

wherein the RFID tags contain unique location information encoded according to a predetermined standard;

wherein the RFID tags are disposed at predetermined intervals within the structure determined according a predetermined standard of placement;

wherein the base unit transmits an interrogation signal to an active RFID tag and receives a schematic of the structure; and wherein the base unit displays the schematic on the display and displays the location of the portable RF transmitter/receiver, the identity of the entity, and the log overlaid on the schematic.

2. The method of claim 1, wherein the base unit comprises a computer including a processor, a memory, an operating system, a database, a human-machine interface, an RF receiver, and an RF transmitter.

3. The method of claim 2, wherein the RF receiver comprises a PC card or a PCMCI card with a USB interface.

4. The method of claim 1, wherein the portable RF transmitter/receiver unit is battery-operated.

5. The method of claim 1, wherein additional RFID tags are provided at entrances and stairwells of the multiple story building.

6. The method of claim 1, wherein when the RF transmitter/receiver is within a range of an RFID tag, the RF transmitter/receiver records an RF signal containing unique location information of the RFID tag within the structure.

7. The method of claim 1, wherein the structure comprises a mine.

8. The method of claim 1, wherein the structure comprises a subway.

9. The method of claim 1, wherein an RFID tag located at an entrance to the structure includes general information about the structure.

10. The method of claim 9, wherein the general information comprises the building's contact information, the number of floors, and a schematic of the structure.

11. The method of claim 1, wherein the base unit maintains a base log comprising information including the identification of the entity, the name of the structure, the location of the structure, the current date, and a listing by time of the positions of the entity as it moves throughout the structure.

12. The method of claim 1, wherein a distance between RFID tags is predetermined based upon a standard that balances accuracy against signal load.

13. The method of claim 1, wherein the base unit maintains a base log comprising information including the identification of the entity, the name of the structure, the location of the structure, the current date, and a listing by time of the positions of the entity as it moves throughout the structure.

14. A method for locating a plurality of entities within a multiple story building using an RFID system including a plurality of portable units, a portable unit comprising a storage, a unique identity, and an RF transmitter/receiver transported by an entity within the multiple story building, a base unit comprising an RF transmitter/receiver and a display, and a plurality of passive RFID tags including information encoded according to a predetermined standard, the method comprising the steps of:

disposing an active RFID tag at an entrance of the structure that is encoded with a schematic of the multiple story building, the building's contact information, and the number of stories of the multiple story building, wherein the location of the active RFID tag is determined according to a predetermined standard of placement corresponding to a second active RFID tag disposed at an entrance of a second building;

the RF transmitter/receiver recording a location of an RFID tag;

the base unit storing the location of the RFID tag in the storage; and the RF transmitter/receiver broadcasting the identity of the unit and the location of the RFID tag to the base unit, which maintains a log of the identity of the unit and the location of the RFID tag, determines the location of the entity from the location of the RFID tag, determines the identity of the entity from the identity of the unit, and maintains a log of the location the entity;

wherein the RFID tags are disposed at predetermined intervals within each story of the multiple story building determined according the predetermined standard of placement; and wherein the base unit displays the schematic on the display and displays the location of the portable RF transmitter/receiver, the identity of the entity, and the log overlaid on the schematic.

wherein an RFID tag located at an entrance to the multiple story building includes general information about the multiple story building including the building's contact information, the number of stories of the multiple story building and a schematic of the multiple story building.

15. The method of claim 14, further comprising disposing an active RFID tag at an entrance of the structure and encoding the active RFID tag with a schematic of the structure, wherein the location of the active RFID tag is determined according to a predetermined standard of placement corresponding to a second active RFID tag disposed at an entrance of a second structure.

* * * * *